United States Patent

Schaede

[11] Patent Number: 5,591,921
[45] Date of Patent: Jan. 7, 1997

[54] DEVICE FOR MEASURING THE BENDING OF A CYLINDER

[75] Inventor: Johannes G. Schaede, Würzburg, Germany

[73] Assignee: Koenig & Bauer-Albert Aktiengesellschaft, Wurzburg, Germany

[21] Appl. No.: 542,739

[22] Filed: Oct. 13, 1995

[30] Foreign Application Priority Data

Oct. 13, 1994 [DE] Germany ............... 44 36 628.0

[51] Int. Cl.⁶ .................................................. G01N 3/20
[52] U.S. Cl. .................................................. 73/849; 73/853
[58] Field of Search ........................ 73/849, 853, 854, 73/856, 858, 862.325, 862.55, 862.321; 464/178

[56] References Cited

U.S. PATENT DOCUMENTS

| | | |
|---|---|---|
| 3,965,735 | 6/1976 | Hartung .................. 73/141 A |
| 4,351,237 | 9/1982 | Tappert et al. . | |
| 4,625,568 | 12/1986 | Hartung et al. ................ 73/862.55 |
| 4,869,112 | 9/1989 | Gram et al. ................ 73/856 |
| 4,958,522 | 9/1990 | McKinlay ................ 73/847 |
| 5,237,880 | 8/1993 | Dobler et al. ................ 73/862.325 |

FOREIGN PATENT DOCUMENTS

| | | |
|---|---|---|
| 2921153 | 12/1980 | Germany . |
| 3432701 | 6/1985 | Germany . |
| 3008230 | 10/1986 | Germany . |
| 8706522.3 | 9/1987 | Germany . |
| 3520344 | 2/1988 | Germany . |

*Primary Examiner*—Richard Chilcot
*Assistant Examiner*—Max H. Noori
*Attorney, Agent, or Firm*—Jones, Tullar & Cooper, P.C.

[57] ABSTRACT

Bending movement of a cylinder in a rotary printing press is measured by using a bending rod that is connected to the cylinder journal at one end and to a lateral register adjustment device at its other end. The bending rod is acted on by the bending forces applied to the cylinder and carries strain gauges that detect the bending of the bending rod. A double jointed coupling is used to connect the lateral register adjusting device to the cylinder journal. The bending rod is situated within this double jointed coupling.

6 Claims, 2 Drawing Sheets

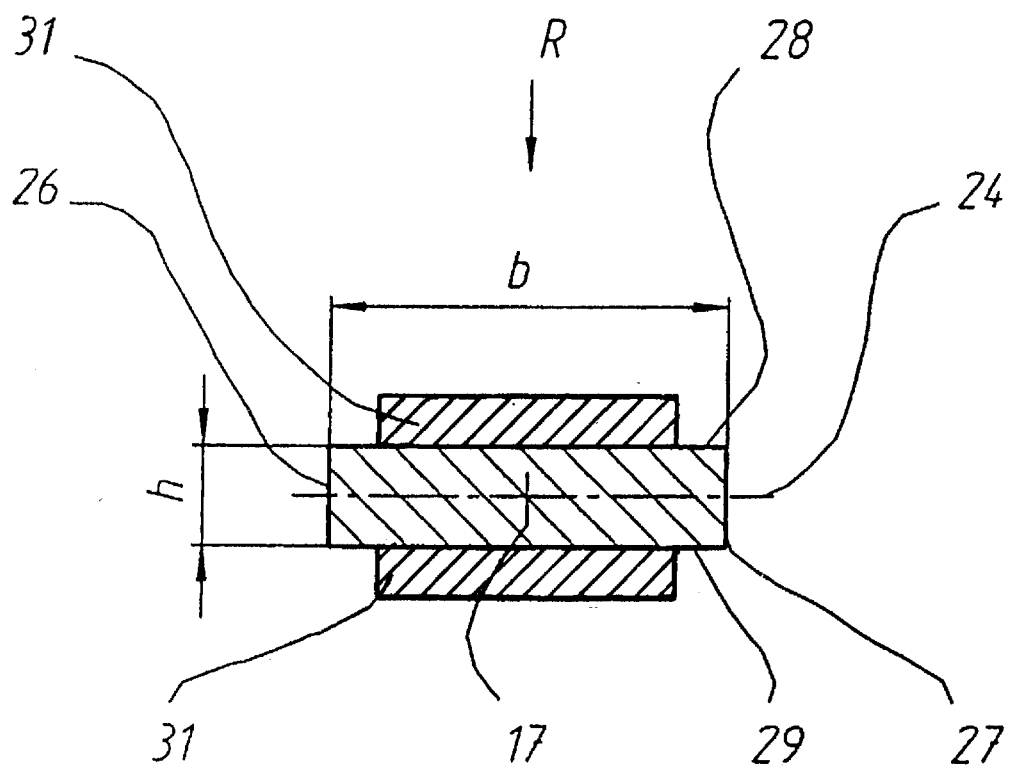

5,591,921

DEVICE FOR MEASURING THE BENDING OF A CYLINDER

FIELD OF THE INVENTION

The present invention is directed generally to a device for measuring the bending of a cylinder. More particularly, the present invention is directed to a device for measuring the bending of a cylinder in a rotary printing press. Most specifically, the present invention is directed to a device for measuring the bending of a cylinder provided with cylinder journals in a rotary printing press. The cylinder is rotatably supported through its journals and is axially shiftable by a lateral register adjusting device. A double jointed coupling is interposed between the cylinder journal and the lateral register adjusting device. A bending rod is connected at one end to the lateral register adjusting device, and at its other end to the cylinder journal through an adaptor so that the bending rod itself does not rotate. The bending rod is provided with strain gauges and its bending can be measured to provide an indication of pressure on the cylinder.

DESCRIPTION OF THE PRIOR ART

In the field of rotary printing, it is generally well known that cooperating cylinder pairs are intended to operate at a certain contact pressure. The amount of pressure should be sufficient to accomplish the desired printing without creating undue stresses on the cylinders themselves or on their support journals and bearing assemblies. One device that is usable to measure the pressure applied between bearer rings of a cylinder is disclosed in German Patent Publication DE 35 20 344 C2. In this device, measurement transducers are placed on the cylinder rings. Signals from these transducers are transmitted in a contactless fashion from the rotating cylinder to a stationary part of an electronic evaluation device.

One limitation of this prior art device is that the placement of the measurement transducers at the cylinder journals is contrary to the requirement for a great deal of rigidity of these cylinder journals. If these cylinder journals are provided with the high degree of rigidity which they need to operate properly, changes in cylinder pressure will create very slight bending movement at the cylinder journals. Such slight bending movements are very difficult to detect using generally available measuring technology. In addition, this prior art device requires an elaborate assembly to transmit the measured bending or stress signals from the rotating cylinder journal to the fixed or stationary part of the electronic evaluation device.

Another prior art device is disclosed in German Patent Publication DE 30 08 230 C2. In this material, there is described a device for use in regulating the printing or contact pressure between cylinders of a printing press by use of a piezo-electric pick-up that is situated in a cylinder bearing.

This prior art device has a limitation because the cylinder bearing needs to have substantial radial rigidity to operate properly, but the measuring device utilizes radial movement. As was the case with the previously discussed prior art device, there is a conflict between the need for strength and rigidity of the components themselves and the reliance by the sensing devices on movement or displacement of these relatively rigid or inflexible structures.

It will thus be seen that a need exists for a device which is usable to measure the deflections of a cylinder which overcomes the limitations of the prior art devices. The device for measuring the bending of a cylinder in accordance with the present invention provides such a device and is a significant improvement over the prior art devices.

SUMMARY OF THE INVENTION

It is an object of the present invention to provide a device for measuring the bending of a cylinder.

Another object of the present invention is to provide a device for measuring the bending of a cylinder in a rotary printing press.

A further object of the present invention is to provide a device for measuring the bending of a cylinder provided with cylinder journals.

Yet another object of the present invention is to provide a device for measuring the bending of a cylinder by using a pressure sensor.

Still a further object of the present invention is to provide a device for measuring the bending of a cylinder having a lateral register adjusting device.

Even still another object of the present invention is to provide a device for measuring cylinder bending which is accurate.

As will be discussed in detail in the description of the preferred embodiment which is presented subsequently, the device for measuring bending of a cylinder in accordance with the present invention is utilized with a cylinder that is provided with support journals and that further is shiftable axially by a lateral register adjustment device. The cylinder journal is coupled to the lateral register adjustment device by use of a double jointed coupling which is resistant to compression and tension. A bending rod is interposed between the lateral register adjustment device and the cylinder journal. The bending rod does not rotate with the cylinder journal and is provided with one or more strain gauges. A slight deflection of the cylinder journal will result in a larger flexure of the bending rod with this larger flexure or bending being accurately measured by the strain gauges to provide a resulting indication of cylinder bending.

The bending rod effectively acts as a multiplier of the minute angular displacement of the cylinder journal which is caused by pressure on the cylinder. This transmission of the angular offset of the cylinder journals to the bearing rod is in a manner that results in increased bending of the bending rod. This movement of the bending rod is of greater magnitude than the bending or deflection of the cylinder journal. This comparatively large bending of the bending rod, even in the situation of relatively small forces acting on the cylinder, is easy to detect using generally conventional measuring technology.

The bending rod in accordance with the present invention is not rotatable. Since the bending rod does not rotate, there is no need for elaborate transmitting elements for transmitting the data from the sensors. In addition, since the bending rod is supported in a manner which makes it free from torsional forces and further since it is provided with a cross-sectional shape that creates a preferred bending direction, the determination of the measuring data provided by the bending rod can be accomplished with very few errors.

The device for measuring the bending of a cylinder in a rotary printing press in accordance with the present invention is integrated into the lateral register adjustment device. This means that it requires no additional structural space. It is thus compact and does not increase the overall size or structural complexity of the press assembly.

The device for measuring the bending of a cylinder overcomes the limitations of the prior art. It provides a substantial advance in the art.

BRIEF DESCRIPTION OF THE DRAWINGS

While the novel features of the device for measuring the bending of a cylinder in accordance with the present invention are set forth with particularity in the appended claims, a full and complete understanding of the invention may be had by referring to the detailed description of the preferred embodiment, which is presented subsequently, and as illustrated in the accompanying drawings, in which:

FIG. 2 is a schematic cross-sectional view of the bending rod with strain gauges applied in accordance with the present invention.

DETAILED DESCRIPTION OF THE PREFERRED EMBODIMENT

Figure 1:
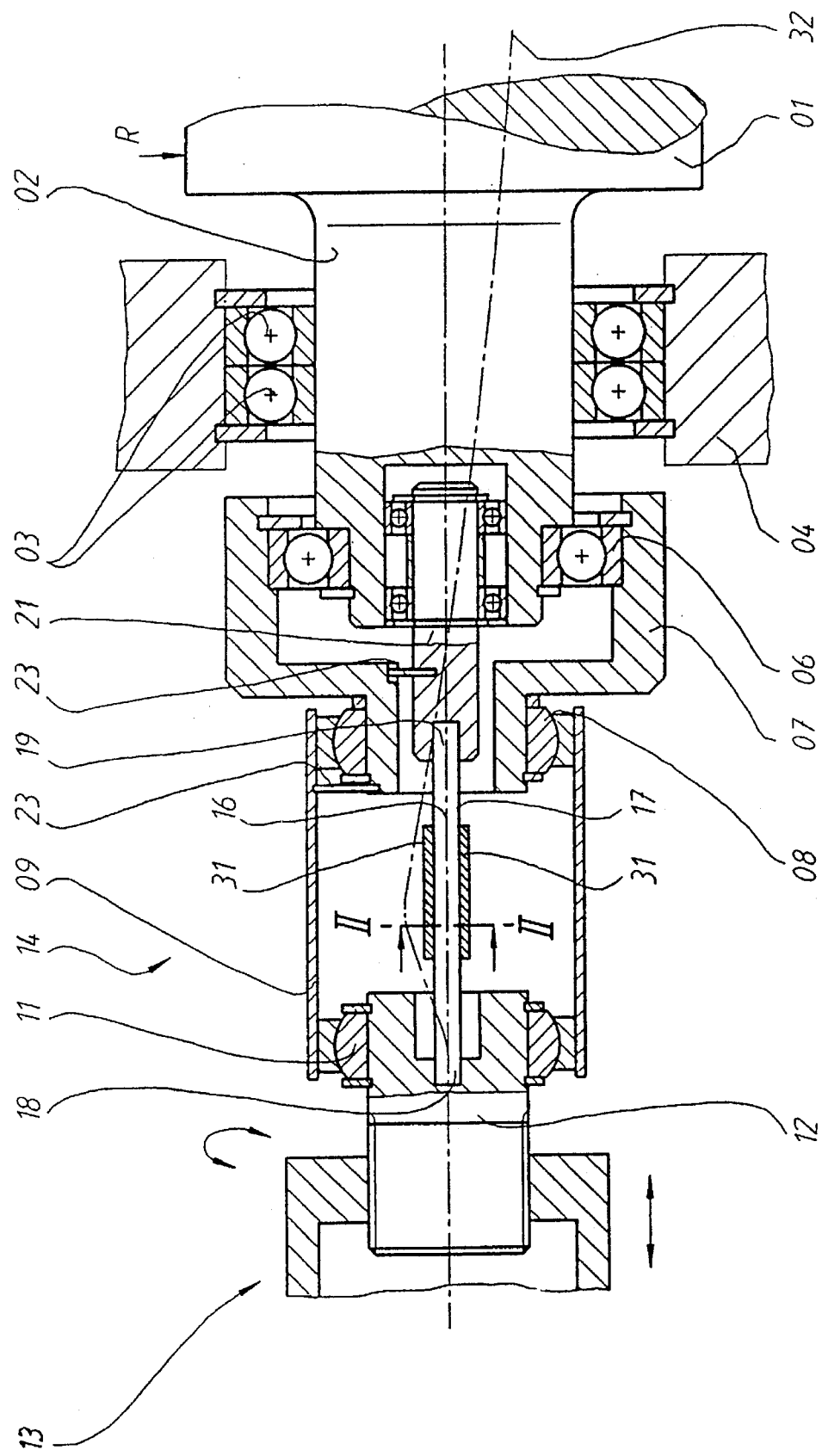
FIG. 1 is a side elevation view, partly in section of a portion of a cylinder and showing the device for measuring the bending of the cylinder, in accordance with the present invention.

Referring initially primarily to FIG. 1, there may be seen a preferred embodiment of a device for measuring the bending of a cylinder in a rotary printing machine in accordance with the present invention. A cylinder 1, which is part of a rotary printing machine, is supported by cylinder journals 2 that are provided at each end of the cylinder. Only one journal 2 for cylinder 1 is depicted in FIG. 1 but it will be understood that the cylinder 1 is provided with journals 2 at both ends. Cylinder 1 is supported for rotation by bearing assemblies 3 which are carried in side frames 4 of the printing press. Again only one bearing assembly 3 and only one side frame 4 is depicted in FIG. 1. The cylinder 1 is axially displaceable in the bearings 3 so that lateral or side register of the plates carried by the cylinder 1 can be accomplished. It will be understood that cylinder 1 rotates about a central axis of rotation and that it is in operative engagement with a cooperating cylinder, not shown. It will further be understood that the cylinder 1 and its cooperating cylinder are in contact with each other under a certain pressure. The subject invention is directed to a device which will measure that pressure and which utilizes bending of the cylinder as the means for measuring the cylinder's operating pressure.

Again referring to FIG. 1, a bearing assembly 6 is carried at the outer end of the cylinder journal 2. This bearing 6 supports a fixed outer adaptor 7 on its outer race. The adaptor does not rotate with the cylinder 1 and its journal 2 but instead is stationary. An inboard end of the fixed adaptor 7 engaged the adaptor support bearing. An outboard end of the fixed adaptor 7 is stepped down and carries a first, non-rotating joint, generally at 8. This joint 8 is connected by a rigid sleeve or tube 9, that is also fixed and thus does not rotate, to a second similar non-rotating joint 11. This second non-rotating joint 11 cooperates with, and is supported by, a shaft journal 12 of an axially displaceable lateral register adjustment device, generally at 13, which is secured to the side frame 4 of the rotary printing press. This lateral register adjustment device 13 is usable to shift the cylinder 1, through the shaft journal 12, the non-rotatable joints 8 and 9 and their associated rigid fixed sleeve 9 and the fixed adaptor piece 7, in an axial direction.

The two joints 8 and 11, together with their associated rigid sleeve 9, form a double jointed coupling 14 which, although it is rigid in the axial direction in that it transmits forces axially, is flexible so that it can compensate for an angular offset between non-parallel shafts and shafts which are possibly offset with respect to each other, and connects them with each other. This double jointed coupling 14 compensates for misalignment and for angular errors with respect to the alignment axis 16 of the shaft journal 12 of the lateral register adjustment device 13 and the cylinder journal 2. It transmits force between the two in the axial direction. The double jointed coupling 14 fixes in place the cylinder 1 with respect to the lateral register adjustment device 13. In the preferred embodiment of the present invention, the two non-rotatable joints 8 and 11, which are also compression and tension resistant, are structured as adjustable bearings. Alternatively, self aligning roller bearings or ball and socket joint couplings could also be used.

As may be seen in FIG. 1 a first end 18 of a bending rod 17 is seated in the shaft journal 12 of the lateral register adjustment device 13. A second end 19 of the bending rod 17 is seated in a free end of an inner adaptor 21. This inner adaptor 21 has a supported end which is supported by axially spaced bearing assemblies in a bore which is formed in the free end of the cylinder journal 2. The inner adaptor 21 thus is stationary while the cylinder journal 2 rotates. A shear pin or torsion protector 23 is used to connect the inner adaptor 21 to the outer adaptor 7. The outer adaptor 7 also has a shear pin or torsion protector 23 which connects it to the fixed rigid sleeve 9 of the double jointed coupling 14. In this way bending movements but no torsional movements can be transmitted to the bending rod 17 from the cylinder journal 2 of the cylinder 1. Instead of the configuration depicted in FIG. 1, it would also be possible to connect the double jointed coupling 14, in a manner secure against relative rotation, with the cylinder journal 2 and to support it rotatably on the shaft journal 12 of the lateral register adjustment device 13.

Referring now to FIG. 2, the bending rod 17 is provided with a cross-sectional shape such that the axial surface moment located in the bending plane 24; i.e. in the plane approximately perpendicular to the resultant R of the effective forces is smaller by at least a factor of 10 than the axial surface moment which is located approximately parallel to the resultant R. In this way, the bending rod 17 can preferably be rectangular and will consist of two lateral side faces 26 and 27, each having a height "h", and a pair of bar sides 28 and 29 each of a length "b". Suitable measuring elements, such as, for example, wire strain gauges 31 are applied to the two base surfaces 28 and 29 which extend generally perpendicular to the resultant force R and thus are generally parallel to the bending plane 24. These wire strain gauges 31 are used for measuring the deformation of the bending rod 17.

In the operation of the device for measuring the bending of a cylinder in a rotary printing press, in accordance with the present invention, it will be assumed that a stress is applied to the cylinder 1. As the cylinder 1 is stressed by this force, in addition to its weight force, the cylinder will bend. Thus bending occurs due to the resultant forces R and the effective axial moments of inertia of the cylinder 1 and of the cylinder journal 2. This resultant force R is supported by the bearings 3 of the cylinder journals 2 and results in the cylinder journals 2 being angularly deflected. The resulting bending line 32 is shown in FIG. 1 in an exaggerated manner. Because of the angular displacement of the cylinder journals 2, the end 19 of the bending rod 17, which is supported by the free end of the inner adaptor 21, is also angularly displaced while the other end 18 of the bending rod 17, which is supported by the shaft journal 12 of the lateral register adjustment device 13, remains fixed in place. The result is a bending force and bending movement created in the bending rod 17. This causes the bending rod 17 to bend. This bending of the bending rod 17 is detected by the wire strain gauges 31 and is communicated to an electronic device which is generally well known. These measurement values, as provided by the strain gauges, are a measurement of the forces acting on the cylinder 1 of the rotary printing press.

While a preferred embodiment of a device for measuring the bending of a cylinder in a rotary printing press, in accordance with the present invention has been set forth fully and completely hereinabove, it will be apparent to one of skill in the art that a number of changes in, for example, the overall size of the cylinder, the type of rotary press used, the type of paper to be printed on and the like could be made without departing from the true spirit and scope of the present invention which is accordingly to be limited only by the following claims.

What is claimed is:

1. A device for measuring bending in a cylinder in a rotary printing press comprising:

a rotatable cylinder having cylinder journals and an axis of rotation;

means for rotatably supporting said cylinder journals in a frame of a rotary printing press, said cylinder being shiftable axially along said axis of rotation;

an axially displaceable lateral register adjustment device secured to said frame;

a double jointed coupling connecting said lateral register adjustment device and said cylinder journal; and a bending rod extending between said cylinder journal and said lateral register adjustment device, said bending rod having a first end secured in a bending-resistant manner to said lateral register adjustment device and having a second end connected in a bending resistant manner and rotatable with respect to said cylinder journal.

2. The device in accordance with claim 1 wherein said bending rod has a first axial surface moment of inertia with respect to a bending plane located approximately perpendicular to a resultant of the effective forces on said cylinder and wherein said bending rod has a second axial surface moment of inertial extending perpendicular with respect to said first surface moment of inertia and approximately parallel to an axis of the resultant forces, said first axial surface moment of inertia being smaller by at least a factor of 10 than said second axial surface moment of inertia.

3. The device in accordance with claim 1 wherein said double jointed coupling includes first and second pivotable, compression and tension resistant joints and a sleeve, said sleeve connecting said first and second joints.

4. The device of claim 3 wherein said first and second joints are adjustable bearings.

5. The device of claim 3 wherein said first and second joints are self-aligning roller bearings.

6. The device of claim 3 wherein said lateral register adjustment device has a shaft journal and further wherein said first joint of said double jointed coupling is connected to said shaft journal and said second joint of said double jointed coupling is connected to said cylinder journal.

* * * * *